United States Patent [19]

Ishiwata

[11] Patent Number: 4,632,516

[45] Date of Patent: Dec. 30, 1986

[54] ELECTROCHROMIC ELEMENT

[75] Inventor: Kazuya Ishiwata, Yokosuka, Japan

[73] Assignee: Canon Kabushiki Kaisha, Tokyo, Japan

[21] Appl. No.: 563,827

[22] Filed: Dec. 21, 1983

[30] Foreign Application Priority Data

Dec. 25, 1982 [JP] Japan .................... 57-234819

[51] Int. Cl.⁴ .................................. G02F 1/17
[52] U.S. Cl. ..................... 350/357; 427/109
[58] Field of Search ............ 350/357; 427/109

[56] References Cited

U.S. PATENT DOCUMENTS 4,416,517 11/1983 Beall .................... 350/357

Primary Examiner—John D. Smith
Attorney, Agent, or Firm—Fitzpatrick, Cella, Harper & Scinto

[57] ABSTRACT

An electrochromic element having an electrochromic layer, formed of cobalt hydroxide or cobalt carbonate as a material for evaporation, and interposed between first and second electrodes, each being made of an electrically conductive film.

22 Claims, 3 Drawing Figures

ELECTROCHROMIC ELEMENT

BACKGROUND OF THE INVENTION

1. Field of the Invention

This invention relates to an electrochromic element which utilizes an electrochemical phenomenon of color formation and extinction, or electrochromic phenomenon.

The electrochromic phenomenon is one in which a substance is colored through the oxidation-reduction reaction when a voltage is applied to it. The electrochemical color forming and extinguishing element may have its applications to, for example, a numerical display element, an X-Y matrix display, an optical shutter, an aperture mechanism, and so on. This electrochromic element can be broadly classified, in terms of its constituent material, into a liquid type and a solid type. The electrochromic element of the present invention is concerned with a full solid type.

2. Description of the Prior Art

FIG. 1 of the accompanying drawing illustrates a conventional full solid type electrochromic element utilizing the electrochromic phenomenon.

The electrochromic element shown in FIG. 1 is constructed with sequential lamination, on a transparent substrate 1, of a first electrode 2 made of a transparent, electrically conductive film, an electrochromic layer 3 as a color forming layer at the cathode side, an insulative layer 4 made of a dielectric film, and a second electrode 5 made of an electrically conductive film.

In the above-described construction of the electrochromic element, the transparent substrate 1 is generally made of a glass plate, although the material is not limited to the glass plate alone, but any other transparent materials such as a plastic (e.g., acrylics, etc.) plate may be used. As to the position of this transparent substrate 1, it may be placed on the second electrode 5, not beneath the first electrode 2, or it may be provided on both surfaces of the first and second electrodes 2, 5 depending on purpose (such as, for example, making it a protective cover for the element). Depending on cases, however, it is necessary that the second electrode be made of a transparent, electrically conductive film, or the electrodes at both sides be made of a transparent, electrically conductive film.

In the following, representative examples of the material to be used generally for the above-mentioned full solid type electrochromic element will be enumerated: the transparent, electrically conductive film to form the first electrode 2 is an indium-tin oxide (ITO) film (containing 5% of $SnO_2$ in $In_2O_3$), and others; the electrochromic layer 3 as the cathode side color forming layer is formed by use of tungsten dioxide ($WO_2$), tungsten trioxide ($WO_3$), molybdenum dioxide ($MoO_2$), molybdenum trioxide ($MoO_3$), vanadium pentoxide ($V_2O_5$), and so forth; the insulation layer 4 as the dielectric film is made of oxide represented by zirconium dioxide ($ZrO_2$), silicon monoxide (SiO), silicon dioxide ($SiO_2$), tantalum pentoxide ($Ta_2O_5$), and so on, or fluorides represented by lithium fluoride (LiF), magnesium fluoride ($MgF_2$), and so forth; and the second electrode 5 is made of, for example, a semi-transparent, electrically conductive film of gold.

The full solid type electrochromic element having the above-described construction brings about an electrochemical reaction by application of a voltage across the first and second electrodes 2, 5 thereby forming or extinguishing color. The color forming mechanism in this electrochromic element is generally said to be ascribable to, for example, formation of bronze due to the double injection of cation and electron into the electrochromic layer 3. For instance, when tungsten trioxide ($WO_3$) is used as the electrochromic substance, there takes place an oxidation-reduction reaction represented by the following equation (1) to form color.

$$WO_3 + xH^+ + xe^- \rightleftharpoons H_xWO_3 \qquad (1)$$

Here, in accordance with the equation (1), tungsten bronze $H_xWO_3$ is produced to form color, and, when the polarity of this applied voltage is reversed, the color is extinguished.

The full solid type electrochromic element of such construction has various disadvantages such that no intended optical density can be obtained at an adequate response speed, and others.

SUMMARY OF THE INVENTION

It is therefore a primary object of the present invention to provide an electrochromic element of an improved construction, by which the above-mentioned various disadvantages are removed, desired optical density becomes obtainable, and the response speed and the life of the element are made much higher and longer.

The characteristic point of the present invention resides in that, in a full solid type electrochromic element as shown in FIG. 2, the electrochromic layer to be formed, as the anode side color forming layer, between the insulative layer and the second electrode, is made of cobalt hydroxide ($Co(OH)_2$) or cobalt carbonate ($CoCO_3$) as a material for evaporation.

According to the present invention, in one aspect of it, there is provided an electrochromic element characterized in that an electrochromic layer is interposed between first and second electrodes, each being made of an electrically conductive film, and that said electrochromic layer is formed of cobalt hydroxide or cobalt carbonate as a material for evaporation.

According to the present invention, in another aspect of it, there is provided an electrochromic element characterized in that it comprises a dielectric film, and an electrochromic layer interposed between first and second electrodes, each being made of an electrically conductive film, said electrochromic layer being formed of cobalt hydroxide or cobalt carbonate as a material for evaporation.

According to the present invention, in still another aspect of it, there is provided an electrochromic element characterized in that it comprises a first electrochromic layer as a color forming layer at the cathode side, an insulative layer made of a dielectric film, and a second electrochromic layer as a color forming layer at the anode side, said second electrochromic layer being formed of cobalt hydroxide or cobalt carbonate as a material for evaporation and interposed between first and second electrodes, each being made of an electrically conductive film.

The foregoing object, other objects as well as the specific material and structure of the electrochromic element according to the present invention will become more apparent and understandable from the following detailed description of a preferred embodiment thereof, when read in conjunction with the accompanying drawing.

DETAILED DESCRIPTION OF PREFERRED EMBODIMENT

Figure 1:
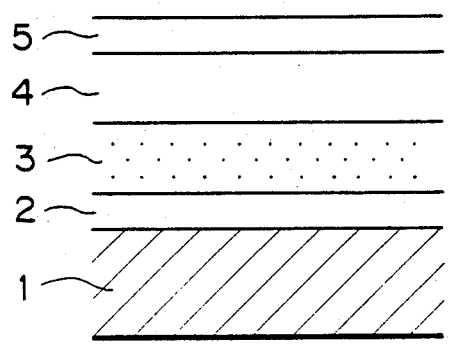
FIG. 1 is a cross-sectional view, in part, showing a construction of one example of a conventional full solid type electrochromic element.

In the following, the present invention will be described in detail in reference to a preferred embodiment thereof shown in FIG. 2. Note should be taken that, in FIG. 2, reference numerals 1, 2, 3, 4 and 5 respectively designate the substrate, the first electrode, the first electrochromic layer as the color forming layer at the cathode side, the insulation layer, and the second electrode, all having the same functions as those shown in FIG. 1.

A reference numeral 6 designates a second electrochromic layer as the color forming layer at the anode side. This second electrochromic layer is formed by use of cobalt hydroxide ($Co(OH)_2$) or cobalt carbonate ($CoCO_3$) as a material for evaporation.

Figure 2:
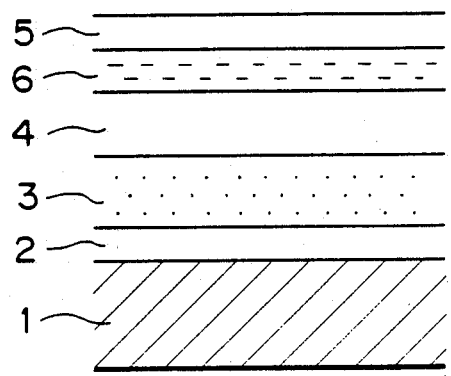
FIG. 2 is also a cross-sectional view, in part, showing a construction of one embodiment of the full solid type electrochromic element according to the present invention.

In more detail, the present invention attempts to improve the optical density, response speed, and operating life of the electrochromic element to their desired level, which could not be attained by the conventional electrochromic element, by addition of, as shown in FIG. 2, the second electrochromic layer 6 formed cobalt hydroxide or cobalt carbonate as a source of evaporation. By thus providing the color forming and extinguishing layer in duplicate, the optical density and the response speed of the electrochromic element become ameliorated. The second electrochromic layer 6 should preferably be formed in thickness of from 500 Å to 3,000 Å, or more preferably from 1,000 Å to 2,000 Å. The second electrochromic layer 6 has the capablity of forming color when it is connected to the anode. The colored pattern formed in this layer can be extinguished by connecting the layer to the cathode. While accurate composition of the electrochromic layer is yet to be clarified, it is inferred that the layer is of a composition containing cobalt hydroxide as the principal constituent.

Figure 3:
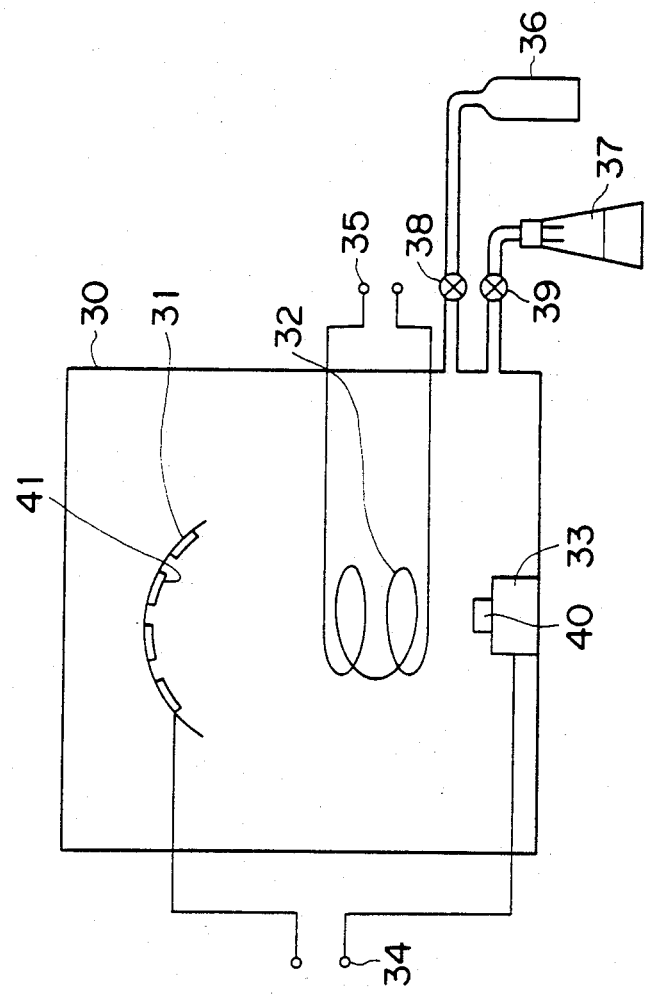
FIG. 3 is a general schematic diagram showing an ion-plating apparatus to be used for the purpose of the present invention.

The electrochromic layer for use in the present invention can be formed in a reactive ion-plating device utilizing cobalt hydroxide or cobalt carbonate as a material for evaporation. As the reactive ion-plating device, there may be used such one as, for example, shown in FIG. 3. In the drawing, a reference numeral 30 designates a vacuum container, a numeral 31 refers to an umbrella, 32 a high frequency winding, 33 an electron gun, 34 a d.c. bias source, 35 a high frequency power source, 36 a water vessel, 37 an oxygen gas bomb, 38 and 39 needle valves, 40 cobalt hydroxide or cobalt carbonate as the material for evaporation, and 41 an object for evaporation.

In FIG. 2, the transparent substrate 1 is generally made of a glass plate, although the material is not limited to the glass plate alone, but any other transparent materials such as a plastic (e.g., acrylics, etc.) plate may be used. As to the position of this transparent substrate 1, it may be placed on the second electrode 5, not beneath the first electrode 2, or it may be provided on both surfaces of the first and second electrodes 2, 5 depending on purpose (such as, for example, making it a protective cover for the element). Depending on cases, however, it is necessary that the second electrode be made of a transparent, electrically conductive film, or the electrodes at both sides be made of a transparent, electrically conductive film.

In the following, representative examples of the material to be used generally for the abovementioned full solid type electrochromic element will be enumerated: the transparent, electrically conductive film to form the first electrode 2 is indium oxide, tin oxide, indiumtin oxide (ITO) film (containing 5% of $SnO_2$ in $In_2O_3$), and so forth; the first electrochromic layer 3 as the cathode side color forming layer (which forms color when connected with the cathode) is formed by use of tungsten dioxide ($WO_2$), tungsten trioxide ($WO_3$), molybdenum dioxide ($MoO_2$), molybdenum trioxide ($MoO_3$), vanadium pentoxide ($V_2O_5$), and so forth, this first electrochromic layer having a thickness range of from 500 Å to 5,000 Å, or more preferably from 1,000 Å to 3,000 Å; the insulative layer 4 as the dielectric film is made of oxides represented by zirconium dioxide ($ZrO_2$), silicon monoxide (SiO), silicon dioxide ($SiO_2$), tantalum pentoxide ($Ta_2O_5$), and so on, or fluorides represented by lithium fluoride (LiF), magnesium fluoride ($MgF_2$), and so forth, this dielectric film having a thickness range of from 500 Å to 5,000 Å, or more preferably from 1,000 Å to 3,000 Å; and the second electrode 5 is made of, for example, a semi-transparent electrically conductive film of gold, besides which indium oxide, tin oxide, ITO and other film material are able to be used.

With a view to enabling those persons skilled in the art to reduce the present invention into practice, the following examples are presented. It should however be noted that these examples are illustrative only and not so restrictive, and that any changes and modifications may be materials used, and others within the spirit and scope of the invention as recited in the appended claims.

EXAMPLE 1

The second electrochromic layer as the anode side color forming layer was formed by the reactive ion-plating method on a glass substrate of "Corning 7059" having a thickness of 0.8 mm and provided thereon with an appropriate electrode pattern (second electrode) of ITO film and lead wires using cobalt hydroxide as the material for evaporation. In this case, water vapor ($H_2O$) was introduced into the vacuum vessel until the vacuum degree thereof indicated $5.0 \times 10^{-4}$ Torr, and the vapor deposition speed was set at 1.0 Å/sec. The thus obtained second electrochromic layer had its film thickness of 1,500 Å. Further, a $Ta_2O_5$ layer as the insulative layer and a $WO_3$ layer as the first electrochromic layer were formed on this second electrochromic layer to the respective film thicknesses of 3,000 Å by means of the vacuum evaporative deposition method. In this case, the vacuum degree was set at $2.0 \times 10^{-5}$ Torr and the vapor deposition speed at 10 Å/sec. Then, on this first electrochromic layer, there was formed a semi-transparent, electrically conductive gold film of 300 Å thick as the first electrode.

When the thus fabricated full solid type electrochromic element was driven by applying a voltage of 2.0 V across the first and second electrodes (with the first electrode as the cathode and the second electrode as the anode), it took 600 m sec. until the optical density reached a valve of 0.3 in terms of $\Delta O.D$ (density variation). In the next place, when a voltage of 2.0 V in the opposite polarity to the above was applied across the first and second electrodes, the colored pattern disappeared.

EXAMPLE 2

The second electrochromic layer as the anode side color forming layer was formed by the reactive ion-plating method on a glass substrate of "Corning 7059" having a thickness of 0.8 mm and provided thereon with an appropriate electrode pattern (second electrode) of ITO film and lead wires using cobalt hydroxide as the material for evaporation. In this case, water vapor ($H_2O$) was introduced into the vacuum vessel until the vacuum degree thereof indicated $5.0 \times 10^{-4}$ Torr, followed by introduction of oxygen ($O_2$) until the vacuum degree in the interior of the vacuum vessel became $5.0 \times 10^{-4}$, while setting the vapor deposition speed at 1.5 Å/sec. The thus obtained second electrochromic layer had its film thickness of 1,500 Å. Further, a $Ta_2O_5$ layer as the insulative layer and a $WO_3$ layer as the first electrochromic layer were formed on this second electrochromic layer to the respective film thicknesses of 3,000 Å by means of the vacuum evaporative deposition method. In this case, the vacuum degree was set at $2.0 \times 10^{-5}$ Torr and the vapor deposition speed at 10 Å/sec. Then, on this first electrochromic layer, there was formed a semi-transparent, electrically conductive film of gold, as the first electrode, to a thickness of 300 Å.

When the thus fabricated full solid type electrochromic element was driven by applying a voltage of 2.0 V across the first and second electrodes (with the first electrode as the cathode and the second electrode as the anode), it took 700 m sec. until the optical density reached a valve of 0.3 in terms of $\Delta O.D$ (density variation). In the next place, when a voltage of 2.0 V in the opposite polarity to the above was applied across the first and second electrodes, the colored pattern disappeared.

EXAMPLE 3

The second electrochromic layer as the anode side color forming layer was formed by the reactive ion-plating method on a glass substrate of "Corning 7059" having a thickness of 0.8 mm and provided thereon with an appropriate electrode pattern (second electrode) of ITO film and lead wires using cobalt hydroxide as the material for evaporation. In this case, oxygen gas ($O_2$) was introduced into the vacuum vessel until the vacuum degree thereof indicated $5.0 \times 10^{-4}$ Torr, while setting the vapor deposition speed at 3.0 Å/sec. The thus obtained second electrochromic layer had its film thickness of 1,500 Å. Further, a $Ta_2O_5$ layer as the insulative layer and a $WO_3$ layer as the first electrochromic layer were formed on this second electrochromic layer to the respective film thicknesses of 3,000 Å by means of the vacuum evaporative deposition method. In this case, the vacuum degree was set at $2.0 \times 10^{-5}$ Torr and the vapor deposition speed at 10 Å/sec. Then, on this first electrochromic layer, there was formed a semi-transparent, electrically conductive film of gold, as the first electrode, to a thickness of 300 Å.

When the thus fabricated full solid type electrochromic element was driven by applying a voltage of 2.0 V across the first and second electrodes (with the first electrode as the cathode and the second electrode as the anode), it took 750 m sec. until the optical density reached a valve of 0.3 in terms of $\Delta O.D$ (density variation). In the next place, when a voltage of 2.0 V in the opposite polarity to the above was applied across the first and second electrodes, the colored pattern disappeared.

EXAMPLE 4

The second electrochromic layer as the anode side color forming layer was formed by the reactive ion-plating method on a glass substrate of "Corning 7059" having a thickness of 0.8 mm and provided thereon with an appropriate electrode pattern (second electrode) of ITO film and lead wires using cobalt carbonate as the material for evaporation. In this case, water vapor ($H_2O$) was introduced into the vacuum vessel until the vacuum degree thereof indicated $5.0 \times 10^{-4}$ Torr, while setting the vapor deposition speed at 1.0 Å/sec. The thus obtained second electrochromic layer had its film thickness of 1,500 Å. Further, a $Ta_2O_5$ layer as the insulative layer and a $WO_3$ layer as the first electrochromic layer were formed on this second electrochromic layer to the respective film thicknesses of 3,000 Å by means of the vacuum evaporative deposition method. In this case, the vacuum degree was set at $2.0 \times 10^{-5}$ Torr and the vapor deposition speed at 10 Å/sec. Then, on this first electrochromic layer, there was formed an semi-transparent, electrically conductive film of gold, as the first electrode, to a thickness of 300 Å.

When the thus fabricated full solid type electrochromic element was driven by applying a voltage of 2.0 V across the first and second electrodes (with the first electrode as the cathode and the second electrode as the anode), it took 800 m sec. until the optical density reached a value of 0.3 in terms of $\Delta O.D$ (density variation). In the next place, when a voltage of 2.0 V in the opposite polarity to the above was applied across the first and second electrodes, the colored pattern disappeared.

EXAMPLE 5

The second electrochromic layer as the anode color forming layer was formed by the reactive ion-plating method on a glass substrate of "Corning 7059" having a thickness of 0.8 mm and provided thereon with an appropriate electrode pattern (second electrode) of ITO film and lead wires using cobalt carbonate as the material for evaporation. In this case, water vapor ($H_2O$) was introduced into the vacuum vessel until the vacuum degree thereof indicated $3.0 \times 10^{-4}$ Torr, followed by introduction of oxygen ($O_2$) until the vacuum degree in the interior of the vacuum vessel became $5.0 \times 10^{-4}$ Torr, while setting the vapor deposition speed at 1.0 Å/sec. The thus obtained second electrochromic layer had its film thickness of 1,500 Å. Further, a $Ta_2O_5$ layer as the insulative layer and a $WO_3$ layer as the first electrochromic layer were formed on this second electrochromic layer to the respective film thicknesses of 3,000 Å by means of the vacuum evaporative deposition method. In this case, the vacuum degree was set at $2.0 \times 10^{-5}$ Torr and the vapor deposition speed at 10 Å/sec. Then, in this first electrochromic layer, there was formed an semi-transparent, electrically conductive film of gold, as the first electrode, to a thickness of 300 Å.

When the thus fabricated full solid type electrochromic element was driven by applying a voltage of 2.0 V across the first and second electrodes (with the first electrode as the cathode and the second electrode as the anode), it took 850 m sec. until the optical density reached a value of 0.3 in terms of ΔO.D (density variation). In the next place, when a voltage of 2.0 V in the opposite polarity to the above was applied across the first and second electrodes, the colored pattern disappeared.

EXAMPLE 6

The second electrochromic layer as the anode side color forming layer was formed by the reactive ion-plating method on a glass substrate of "Corning 7059" having a thickness of 0.8 mm and provided thereon with an appropriate electrode pattern (second electrode) of ITO film and lead wires using cobalt carbonate as the material for evaporation. In this case, oxygen ($O_2$) gas was introduced into the vacuum vessel until the vacuum degree thereof indicated $5.0 \times 10^{-4}$ Torr, while setting the vapor deposition speed at 1.0 Å/sec. The thus obtained second electrochromic layer had its film thickness of 1,500 Å. Further, a $Ta_2O_5$ layer as the insulative layer and a $WO_3$ layer as the first electrochromic layer were formed on this second electrochromic layer to the respective film thicknesses of 3,000 Å by means of the vacuum evaporative deposition method. In this case, the vacuum degree was set at $2.0 \times 10^{-5}$ Torr and the vapor deposition speed at 10 Å/sec. Then, on this first electrochromic layer, there was formed an semi-transparent, electrically conductive film of gold, as the first electrode, to a thickness of 300 Å.

When the thus fabricated full solid type electrochromic element was driven by applying a voltage of 2.0 v across the first and second electrodes (with the first electrode as the cathode and the second electrode as the anode), it took 1.0 sec. until the optical density reached a value of 0.3 in terms of ΔO.D (density variation). In the next place, when a voltage of 2.0 V in the opposite polarity to the above was applied across the first and second electrodes, the colored pattern disappeared.

What I claim is:

1. An electrochromic element, characterized in that an electrochromic layer is interposed between first and second electrodes, each being made of an electrically conductive film, and that said electrochromic layer is formed by evaporating cobalt carbonate.

2. The electrochromic element as set forth in claim 1, wherein said electrochromic layer has a film thickness range of from 500 Å to 3,000 Å.

3. The electrochromic element as set forth in claim 1, wherein said electrochromic layer has a film thickness range of from 1,000 Å to 2,000 Å.

4. An electrochromic element, characterized in that it comprises a dielectric film, and an electrochromic layer interposed between first and second electrodes, each being made of an electrically conductive film, and that said electrochromic layer is formed by evaporating cobalt carbonate.

5. The electrochromic element as set forth in claim 4, wherein said electrochromic layer has a film thickness range of from 500 Å to 3,000 Å.

6. The electrochromic element as set forth in claim 4, wherein said electrochromic layer has a film thickness range of from 1,000 Å to 2,000 Å.

7. The electrochromic element as set forth in claim 4, wherein said dielectric film is made of a substance selected from oxides and fluorides.

8. The electrochromic element as set forth in claim 7, wherein said oxide is at least one selected from the group consisting of zirconium dioxide, silicon monoxide, silicon dioxide, and tantalum pentoxide.

9. The electrochromic element as set forth in claim 7, wherein said fluoride is at least one selected from lithium fluoride and magnesium fluoride.

10. The electrochromic element as set forth in claim 4, wherein said dielectric film has a film thickness range of from 500 Å to 5,000 Å.

11. The electrochromic element as set forth in claim 4, wherein said dielectric film has a film thickness range of from 1,000 Å to 3,000 Å.

12. An electrochromic element characterized in that it comprises a first electrochromic layer as a color forming layer at the cathode side, an insulative layer made of a dielectric film, and a second electrochromic layer as a color forming layer at the anode side, said second electrochromic layer being formed by evaporating cobalt carbonate, and interposed between first and second electrodes, each being made of an electrically conductive film.

13. The electrochromic element as set forth in claim 12, wherein said second electrochromic layer has a film thickness range of from 500 Å to 3,000 Å.

14. The electrochromic element as set forth in claim 12, wherein said second electrochromic layer has a film thickness range of from 1,000 Å to 2,000 Å.

15. The electrochromic element as set forth in claim 12, wherein said first electrochromic layer has a film thickness range of from 500 Å to 5,000 Å.

16. The electrochromic element as set forth in claim 12, wherein said first electrochromic layer has a film thickness range of from 1,000 Å to 3,000 Å.

17. The electrochromic element as set forth in claim 12, wherein said dielectric film is made of a substance selected from oxides and fluorides.

18. The electrochromic element as set forth in claim 17, wherein said oxide is at least one selected from the group consisting of zirconium dioxide, silicon monoxide, silicon dioxide, and tantalum pentoxide.

19. The electrochromic element as set forth in claim 17, wherein said fluoride is at least one selected from the group consisting of lithium fluoride and magnesium fluoride.

20. The electrochromic element as set forth in claim 12, wherein said dielectric film has a film thickness range of from 500 Å to 5,000 Å.

21. The electrochromic element as set forth in claim 12, wherein said dielectric film has a film thickness range of from 1,000 Å to 3,000 Å.

22. The electrochromic element as set forth in claim 11, wherein said first electrochromic layer is formed of at least one compound selected from the group consisting of tungsten dioxide, tungsten trioxide, molybdenum dioxide, molybdenum trioxide, and vanadium pentoxide.

* * * * *